United States Patent
Chen et al.

(10) Patent No.: US 7,728,645 B2
(45) Date of Patent: Jun. 1, 2010

(54) PULSE GENERATOR

(75) Inventors: Shih-Chang Chen, Taipei Hsien (TW);
Shen-An Chen, Taipei Hsien (TW);
Rong-Cong Hung, Taipei Hsien (TW);
You-Ren Lin, Taipei Hsien (TW);
Rong-Hwang Horng, Taipei Hsien (TW); Yaw-Shen Lai, Taipei Hsien (TW)

(73) Assignee: Foxnum Technology Co., Ltd., Tucheng, Taipei County (TW)

( * ) Notice: Subject to any disclaimer, the term of this patent is extended or adjusted under 35 U.S.C. 154(b) by 29 days.

(21) Appl. No.: 12/262,174

(22) Filed: Oct. 30, 2008

(65) Prior Publication Data
US 2010/0052759 A1 Mar. 4, 2010

(30) Foreign Application Priority Data
Aug. 26, 2008 (CN) ......................... 2008 1 0304199

(51) Int. Cl.
*H03K 3/00* (2006.01)

(52) U.S. Cl. .................. 327/291; 327/299; 327/172
(58) Field of Classification Search ................. None
See application file for complete search history.

(56) References Cited

U.S. PATENT DOCUMENTS 6,677,786 B2 * 1/2004 Kellgren et al. ............. 327/116
2009/0234898 A1 * 9/2009 Horng et al. ................ 708/102

* cited by examiner

*Primary Examiner*—An T Luu
(74) *Attorney, Agent, or Firm*—Zhigang Ma

(57) ABSTRACT

A pulse generator includes a pulse command register and a digital differential analyzer (DDA). The pulse command register includes a first register, a second register, and an adder. The first register receives and stores a pulse command from a CPU in an operating cycle. The second register receives and stores the pulse command shifted from the first register when the first register receives a second pulse command from the CPU in the operating cycle. The adder sums the pulse commands of the first register and the second register and the result is transmitted to the DDA. The DDA determines whether a pulse is to be generated after calculation according to the result from the adder of the pulse command register.

4 Claims, 3 Drawing Sheets

PULSE GENERATOR

BACKGROUND

1. Technical Field

The disclosure generally relates to pulse generators and, particularly, to a pulse generator controlling a servo motor.

2. Description of Related Art

A digital differential analyzer (DDA) is a digital implementation of a differential analyzer. The DDA generates a pulse command to control motion of a servo motor. The DDA receives a pulse command from a CPU in an operating cycle and generates a pulse command after calculation. Normally, the operating cycle of the CPU is the same as that of the DDA. If errors occur between the CPU and DDA, the CPU may send two pulse commands to the DDA in an operating cycle. The DDA cannot generate two corresponding pulse commands in one operating cycle.

What is needed, therefore, is a pulse generator which can overcome the described limitations.

DETAILED DESCRIPTION OF THE EMBODIMENT

Figure 1:
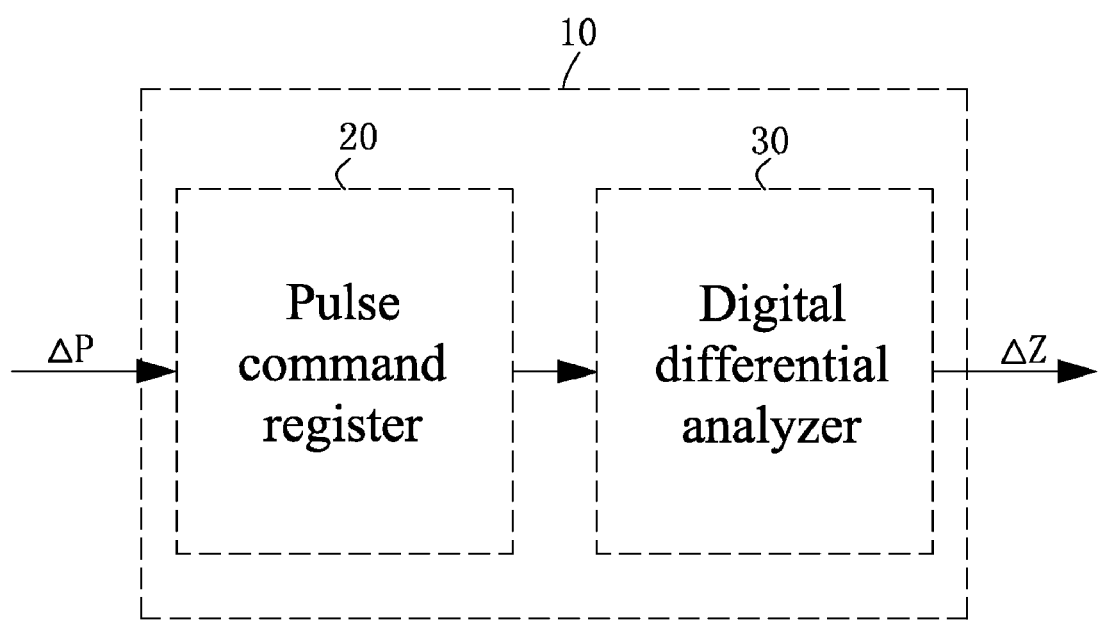
FIG. 1 is a block diagram illustrating a pulse generator in accordance with an embodiment of the disclosure, the pulse generator including a pulse command register and a DDA.
Figure 2:
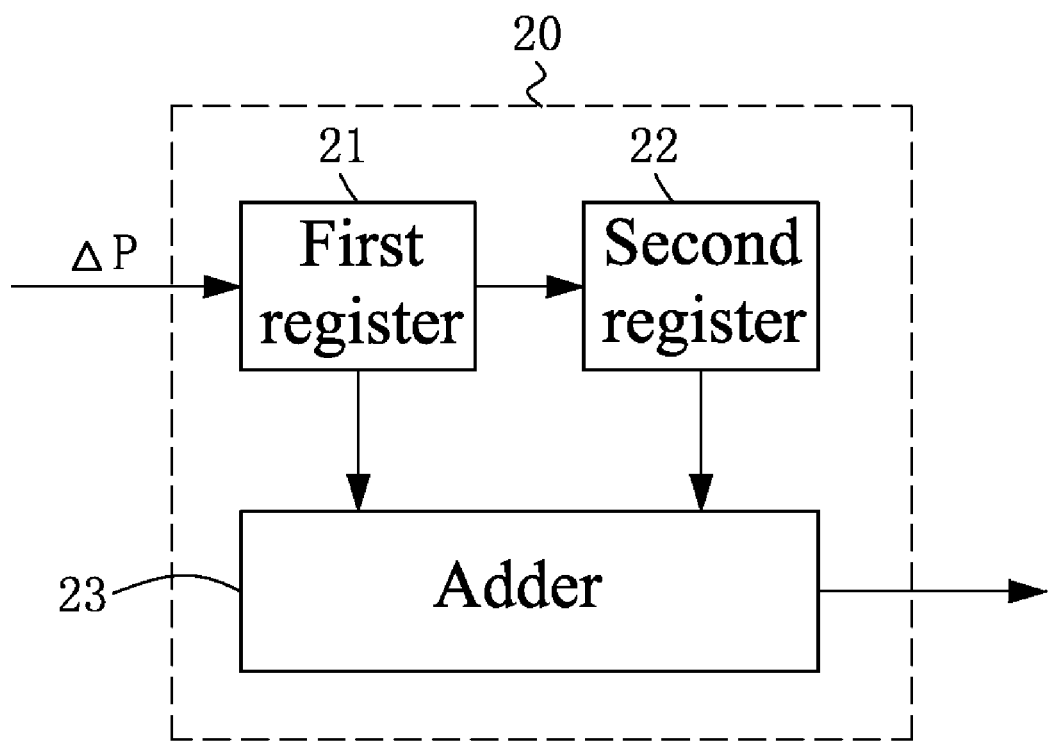
FIG. 2 is a block diagram of the pulse command register of the pulse generator of FIG. 1.
Figure 3:
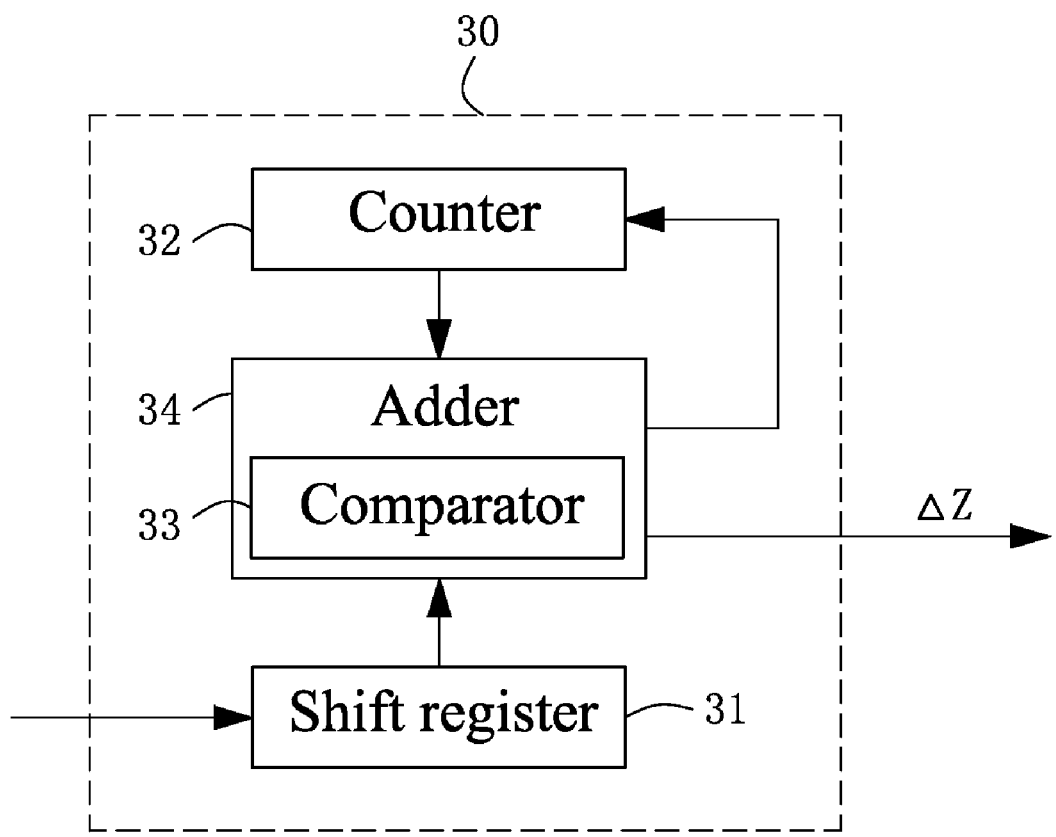
FIG. 3 is a block diagram of the DDA of the pulse generator of FIG. 1.

Referring to FIG. 1, a pulse generator 10 for controlling a servo motor of the disclosure includes a pulse command register 20 and a DDA 30. Referring to FIG. 2, the pulse command register 20 includes a first register 21, a second register 22, and an adder 23. Referring to FIG. 3, the DDA 30 includes a shift register 31, a counter 32, and an adder 34 with a comparator 33. Each of the shift register 31, the counter 32, and the comparator 33 has a beginning number.

The first register 21 of the pulse command register 20 is configured for receiving and saving a pulse command ΔP from a CPU in an operating cycle. The second register 22 of the pulse command register 20 is configured for receiving and saving a shift pulse command output from the first register 21. The adder 23 adds the pulse command ΔP of the first register 21 to the shift command of the second register 22 and transmits the result to the DDA 30.

When there is an error between the cycle of the CPU sending the pulse command and the operating cycle of the DDA, the error could be accumulated. After a certain error accumulation, the CPU may send two pulse commands to the DDA 30 in one operating cycle. The first register 21 of the pulse command register 20 receives and stores the first pulse command from the CPU in the operating cycle. When the CPU transmits a second pulse command to the pulse command register 20 in the operating cycle, the second register 22 of the pulse command register 20 receives and stores the first pulse command shifted from the first register 21. The first register 21 of the pulse command register 20 receives and stores the second pulse command from the CPU in the operating cycle. The adder 23 sums the pulse commands of the first register 21 and the second register 22 and transmits the accumulated pulse command to the DDA 30.

The shift register 31 of the DDA 30 receives the accumulated pulse command shifted from the pulse command register 20. The adder 34 sums the beginning number of the shift register 31 and the beginning number of the counter 32. The comparator 33 compares the sum of the adder 34 to the beginning number of the comparator 33. If the sum of the adder 34 equals or exceeds the number of the comparator 33, the DDA 30 generates a pulse ΔZ. The sum of the adder 34 is subtracted by the number of the comparator 33 and the result is transmitted to the counter 32 and stored as the number of the counter 32 for a subsequent calculation. If the sum of the adder 34 is less than the number of the comparator 33, no pulse is generated. The sum of the adder 34 is delivered to the counter 32 and stored as the number of the counter 32 for the subsequent calculation.

It should be noted that the pulse command register 20 can receive and store two pulse commands from the CPU in an operating cycle. The pulse command register 20 sums two pulse commands and transmits the result to the DDA 30. The DDA 30 does not lose the second pulse command from the CPU in an operating cycle. The number of the pulse command register 20 can be added according to the error of the operating cycle between the CPU and the DDA 30.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A pulse generator comprising:
    a pulse command register comprising a first register, a second register, and an adder, the first register being configured for receiving and saving a first pulse command from a CPU in an operating cycle, the second register being configured for receiving and saving the pulse command shifted from the first register when the first register receives a second pulse command transmitted from the CPU in the operating cycle, and the adder being configured for summing the pulse commands of the first register and the second register;
    a digital differential analyzer (DDA), connected with the pulse command register, configured for determining whether to generate a pulse after calculation according to the result of the adder of the pulse command register.

2. The pulse generator as claimed in claim 1, wherein the DDA comprises a shift register, a counter, and an adder with a comparator, the shift register, the counter and the comparator each have a beginning number, the shift register is configured to receive the pulse command shift from the pulse command register, the adder is configured to sum the number of the shift register and the number of the counter, and the comparator is configured to compare the sum of the adder with the number of the comparator to determine whether a pulse is to be generated.

3. The pulse generator as claimed in claim 2, wherein, if the sum of the adder equals or exceeds the number of the comparator, the DDA generates a pulse, and the sum of the adder is subtracted by the number of the comparator and the result is transmitted to the counter and saved as the number of the counter.

4. The pulse generator as claimed in claim 2, wherein, if the sum of the adder is less than the number of the comparator, no pulse is generated, and the sum of the adder is delivered to the counter by the adder and saved as the number of the counter.

* * * * *